(12) United States Patent
Lichtwald

(10) Patent No.: US 8,154,993 B2
(45) Date of Patent: Apr. 10, 2012

(54) METHOD FOR PROVIDING ALTERNATIVE PATHS AS A RAPID REACTION TO THE FAILURE OF A LINK BETWEEN TWO ROUTING DOMAINS

(75) Inventor: Götz Lichtwald, Walzbachtal-Wössingen (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 416 days.

(21) Appl. No.: 11/916,248

(22) PCT Filed: Jun. 1, 2006

(86) PCT No.: PCT/EP2006/062807
§ 371 (c)(1),
(2), (4) Date: Jan. 9, 2008

(87) PCT Pub. No.: WO2006/128893
PCT Pub. Date: Dec. 7, 2006

(65) Prior Publication Data
US 2008/0198741 A1    Aug. 21, 2008

(30) Foreign Application Priority Data
Jun. 2, 2005 (DE) .................. 10 2005 025 420

(51) Int. Cl.
*H04L 12/28* (2006.01)
(52) U.S. Cl. ............................................ 370/225
(58) Field of Classification Search ........ 370/200–253, 370/503, 459, 395.3–395.32, 255–256; 709/239; 395/200.69
See application file for complete search history.

(56) References Cited

U.S. PATENT DOCUMENTS
6,421,316 B1 * 7/2002 Masuo ...................... 370/216
(Continued)

FOREIGN PATENT DOCUMENTS
EP    1453250    9/2004
(Continued)

OTHER PUBLICATIONS

XP-002226832, Y. Rekhter et al., A Border Gateway Protocol 4 (BGP-4), Mar. 1995, pp. 1-57.

(Continued)

*Primary Examiner* — Pao Sinkantarakorn
*Assistant Examiner* — Iqbal Zaidi
(74) *Attorney, Agent, or Firm* — Laurence A. Greenberg; Werner H. Stemer; Ralph E. Locher

(57) ABSTRACT

The present disclosure relates to a method for providing substitute routes in rapid response to the failure of a link between two routing domains in a packet-oriented network. After the failure of a link has been identified, substitute routes are provided for routes which have been interrupted by said failure by locally selecting alternative routes and propagating messages along the substitute routes. In order to provide substitute routes, an inter-domain router checks whether the router contains a substitute route. If there is no substitute route, a request message is transmitted to at least one adjacent inter-domain router and the transmission of at least one substitute route is thus requested. If there is a substitute route in the adjacent inter-domain router, the inter-domain router making the enquiries is informed of this in a response message. The present disclosure thus results in the improved provision of substitute routes in response to disruptions in inter-domain routing.

10 Claims, 3 Drawing Sheets

U.S. PATENT DOCUMENTS

| | | | |
|---|---|---|---|
| 7,239,618 B1* | 7/2007 | La Porta et al. | 370/331 |
| 7,639,663 B1* | 12/2009 | Nerses et al. | 370/347 |
| 2002/0131362 A1* | 9/2002 | Callon | 370/216 |
| 2003/0007500 A1 | 1/2003 | Rombeaut et al. | |
| 2006/0159076 A1* | 7/2006 | Bless et al. | 370/356 |

FOREIGN PATENT DOCUMENTS

| | | | |
|---|---|---|---|
| WO | WO2004077759 | * | 9/2004 |
| WO | WO2004077759 | * | 10/2004 |

OTHER PUBLICATIONS

Rekhter Y. et al., "A Border Gateway Protocol 4 (BGP-4)", RFC 1771, Mar. 1995 XP-002226832, pp. 1-54.

Bless et al. "Fast Scoped Rerouting for BGP", Institute of Telematics, University of Karlsruhe, Germany, IEEE, 2003, pp. 25-30.

Chinese Office Action dated May 10, 2010.

* cited by examiner

METHOD FOR PROVIDING ALTERNATIVE PATHS AS A RAPID REACTION TO THE FAILURE OF A LINK BETWEEN TWO ROUTING DOMAINS

FIELD OF TECHNOLOGY

The present disclosure relates to method for providing alternative paths as a rapid reaction to the failure of a link between two routing domains in a packet-oriented network.

More specifically, the present disclosure relates to the field of Internet technologies, and the field of routing methods in packet-oriented networks, and is targeted at the transmission of data under realtime conditions.

BACKGROUND

An important development in the field of networks at present is the convergence of voice and data networks. An important future scenario is that data, voice and video information are transmitted via a packet-oriented network, with newly developed network technologies assuring that requirement features for various classes of traffic are observed. Future networks for various types of traffic are anticipated to operate in packet-oriented fashion. Current development activities relate to the transmission of voice information via networks which are conventionally used for data traffic, particularly IP (Internet Protocol) based networks.

To allow voice communication via packet networks and particularly IP based networks in a quality which is equivalent to that of voice transmission via circuit-switched networks, it is necessary for quality parameters such as the delay for data packets or jitter to be kept within narrow limits. In the case of voice transmission, it is of great importance to the quality of the service provided for the delay times not to substantially exceed values of 150 milliseconds. To achieve a correspondingly short delay, work is being carried out on improved routers and routing algorithms which are intended to allow faster handling of the data packets. In the case of routing via IP networks, a distinction is usually drawn between intra-domain and inter-domain routing. Data transmission via the Internet usually involves networks—as well as subnetworks, to domains or what are known as autonomous systems—from various network operators. The network operators are responsible for the routing within the domains which come under their area of responsibility. Within these domains, they have the freedom to adapt the procedure for routing according to their own wishes as desired, just so long as it is possible to comply with quality-of-service features. The situation is different in the case of routing between different domains, where different domain operators are connected to one another. Inter-domain routing is complicated by the fact that first it is necessary to determine the best possible paths to the destination via various domains, but secondly, domain operators are able to apply strategies locally which influence global calculation of optimum paths on the basis of objective criteria. By way of example, one strategy involves domains from network operators in a particular country being avoided for traffic of a certain origin. However, this strategy is now generally not known to all network operators with domains via which the traffic is routed, i.e. a network operator needs to make a local decision regarding the domain to which he forwards traffic without having complete information about the best path in terms of metrics. The strategies are frequently also referred to by the term "policies".

For the routing between various domains, what are known as Exterior Gateway Protocols EGP are used. At present, version 4 of the Border Gateway Protocol (frequently shortened to BGP), described in more detail in RFC (Request for Comments) 1771, is usually used on the Internet. The Border Gateway Protocol is what is known as a path vector protocol. A BGP entity (the term "BGP speaker" is frequently used in English literature) is informed by its BGP neighbors about possible paths to destinations which can be reached via the respective BGP neighbor. Similarly communicated properties of the paths (path attributes) provide the BGP entity with the best respective path from its local point of view to the destinations which can be reached. The BGP protocol involves four types of messages being exchanged between BGP entities. The messages including what is known as an "update" or change message, which is used to propagate path information through the entire network and which allows the network to be optimized with topology changes. Sending update messages usually results in the path information being adapted on all BGP entities in the network for the purpose of routing optimized in line with the locally available information. In addition, what are known as "keepalive" or "state" confirmation messages are a feature, these being used by a BGP entity to enlighten its BGP neighbors about its operability. In the absence of these messages, the BGP neighbors assume that the link to the BGP entity has been disrupted.

The propagation of topology information using the BGP protocol has the drawback that when there are frequent change indications the load which arises as a result of the messages propagated through the network in order to indicate the change is considerable, and that the network does not converge out if change messages follow in too quick succession. This problem that the network does not converge out or that the inter-domain routing does not become stable, has been addressed by what is known as the route flap damping approach. The idea of this concept is to sanction the indication of a change by a BGP neighbor. When a change message is received, the damping parameter is increased, and change reports are ignored if the damping parameter exceeds a threshold. The damping parameter decreases exponentially over time. Consequently, change reports from BGP entities are ignored so long as the damping value has not dropped below the lower threshold (reuse threshold). However, the method has the drawback that it carries the risk of a potential loss of connection, which cannot be tolerated for realtime traffic.

EP 1453250, which is incorporated by reference in its entirety herein, describes an approach for extending the BGP protocol by a method for rapid reaction to link failures in the case of Inter-domain routing. This approach provides alternative paths, with no prior propagation of change messages for the entire network being required. A change to the routing is made only along alternative paths. This limited adjustment to the routing allows a rapid reaction to faults. In the case of prolonged faults (persistent error), it is additionally possible to perform topology adaptation in the network using the BGP protocol.

SUMMARY

Accordingly, various embodiments are disclosed to improve the provision of alternative paths as a reaction to link failures in the case of inter-domain routing.

The present disclosure is targeted at the availability of alternative paths in the event of disruption to the Inter-domain routing as a result of a link failure. Such alternative paths can be calculated using an EGP (Exterior Gateway Protocol) protocol, for example, and can be reserved by Inter-domain routers. The invention provides for an Inter-domain router, having established that a link has failed, to send a request to a neighboring Inter-domain router in the absence of an alternative path.

If the neighboring Inter-domain router sends notification of an alternative path, this alternative path can be used for Inter-domain routing in order to bypass the failed link. In this case, the Inter-domain routing along this alternative path is set such that data packets which would normally be routed via the disrupted link are routed along the alternative path to their destination (e.g. provided by one or more destination network prefixes).

In this context, link failure is understood to mean any fault which interrupts the connection or the connectivity between two routing domains. A routing domain (the expressions "autonomous system" or "subnetwork" are also used in the literature) is characterized by uniform routing within the domain. By way of example, packets within a domain are routed using the OSPF (Open Shortest Path First) protocol. By contrast, the present disclosure relates to the routing between domains (Inter-domain routing), a method for providing alternative paths being assumed in order to be able to react rapidly and more stably (in comparison with BGP topology changes) to link failures between domains. In this case, the link failure is established by a routing domain. This is done by a router in the routing domain which is equipped with protocol software for Inter-domain routing. Such routers are subsequently referred to as Inter-domain routers, EGP (Exterior Gateway Protocol) routers or EGP entities. In the case of the BGP (Border Gateway Protocol) protocol, reference is also made to a BGP speaker or a BGP entity. When an alternative path has been provided, a message about the link failure is propagated, but not through the entire network (as in the case of BGP) but rather only along the alternative path. Routers which receive the message adjust their Inter-domain routing for routing along the alternative path. By way of example, this is done by changing routing tables from Inter-domain routers associated with the domains situated on the alternative path.

In line with the present disclosure, when the link failure has been established, Inter-domain routers check whether the router has an alternative path available. If this is not the case, a request message is sent to a neighboring Inter-domain router, requesting the transmission of at least one alternative path. By way of example, this request message contains information about the failed link and the destination to be reached, so that the Inter-domain router receiving the message can look for paths to the destination which avoid the link. If there is an alternative path in the neighboring Inter-domain router, it is transmitted using a response message. If there are a plurality of alternative paths, the notification may include all of them or the best one on the basis of suitable criteria (metrics, bandwidth, availability). This concept can be extended such that a response message is also sent when there is no alternative path, in order to notify the requesting Inter-domain router of this result from its request.

In this case, neighboring Inter-domain routers are Inter-domain routers which can communicate with one another without the mediation of a further Inter-domain router. In principle, neighboring Inter-domain routers may be in the same autonomous system or in different autonomous systems. They may be connected directly by a link or by means of further routers which do not support Inter-domain routing.

The invention extends the concept which is known from EP 1453250. Alternative paths for Inter-domain routing which avoids link failure can also be obtained and used, in line with the invention, if they are present only in the neighboring Inter-domain router at the time at which the fault is identified.

In the absence of an alternative path, it is advantageous to send request messages to all available neighboring internal BGP routers (the link failure may result in a neighboring EGP router not being available).

Since the time factor for reaction to a fault plays an important part, it should not be retarded too greatly by waiting for the notification of an alternative path. Therefore, one development proposes introducing a timer and, when the timer runs out, only taking account of alternative paths received up until then. By way of example, when the timer has run out, it is possible to select the best alternative path from the communicated alternative paths on the basis of criteria such as metrics and availability. Another practice is to use the first alternative path communicated within the timer runtime in order to minimize the delay caused by the link failure. If neighboring EGP routers provide no notification of an alternative path within the timer runtime, a fault reaction can be implemented on the basis of the EGP protocol used, e.g. topology adaptation using the BGP protocol.

The present disclosure is also directed to a router that is designed for communication with other routers using an EGP protocol (EGP router), and additionally has means for carrying out the inventive method (particularly for sending/receiving/evaluating request and response messages). These means may comprise both hardware means (CPU, ASIC) and software means (computer routines, communication protocols).

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
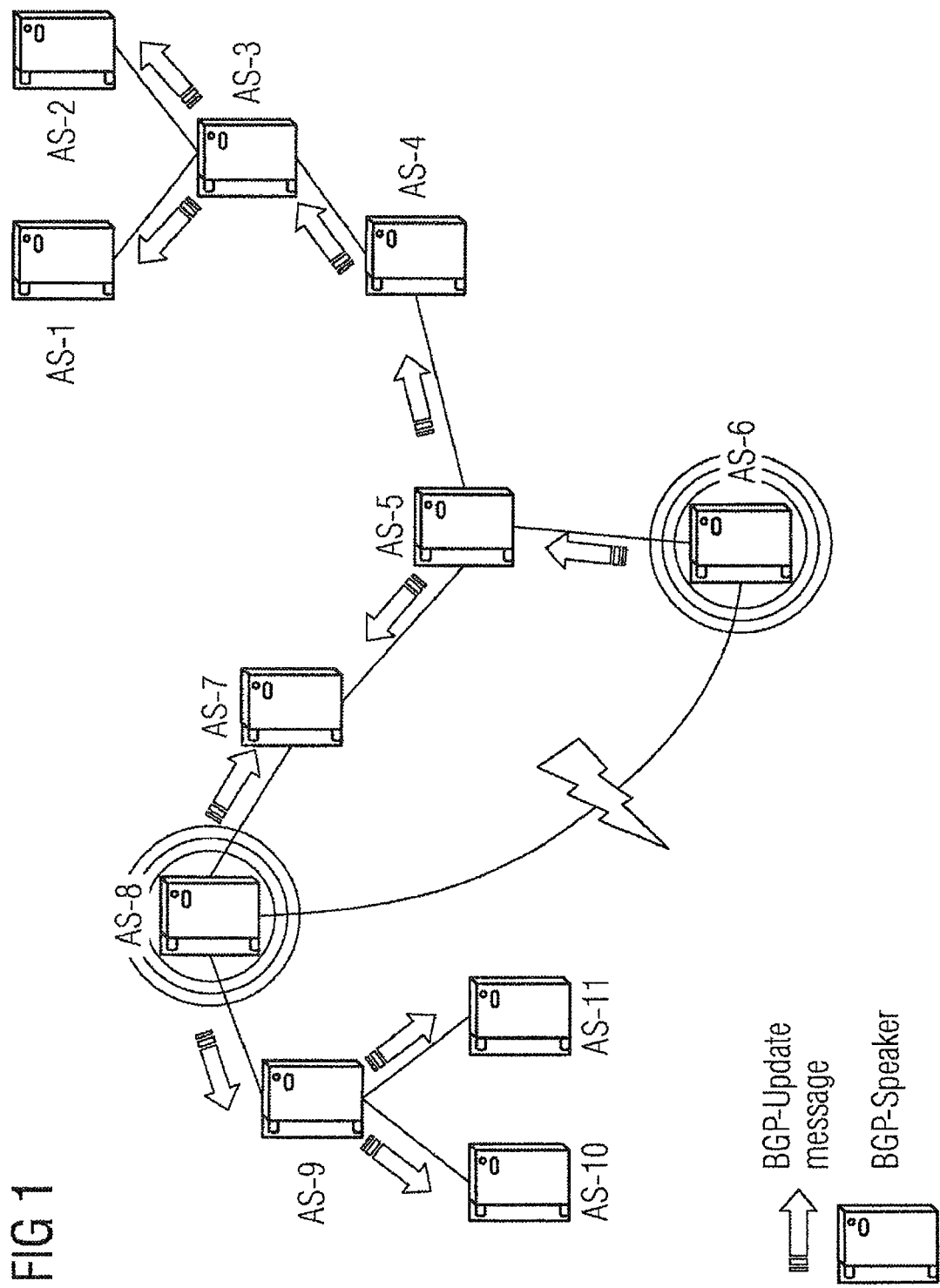
FIG. 1 illustrates an exemplary reaction based on the BGP protocol in the event of link failure with BGP Inter-domain routing.
Figure 2:
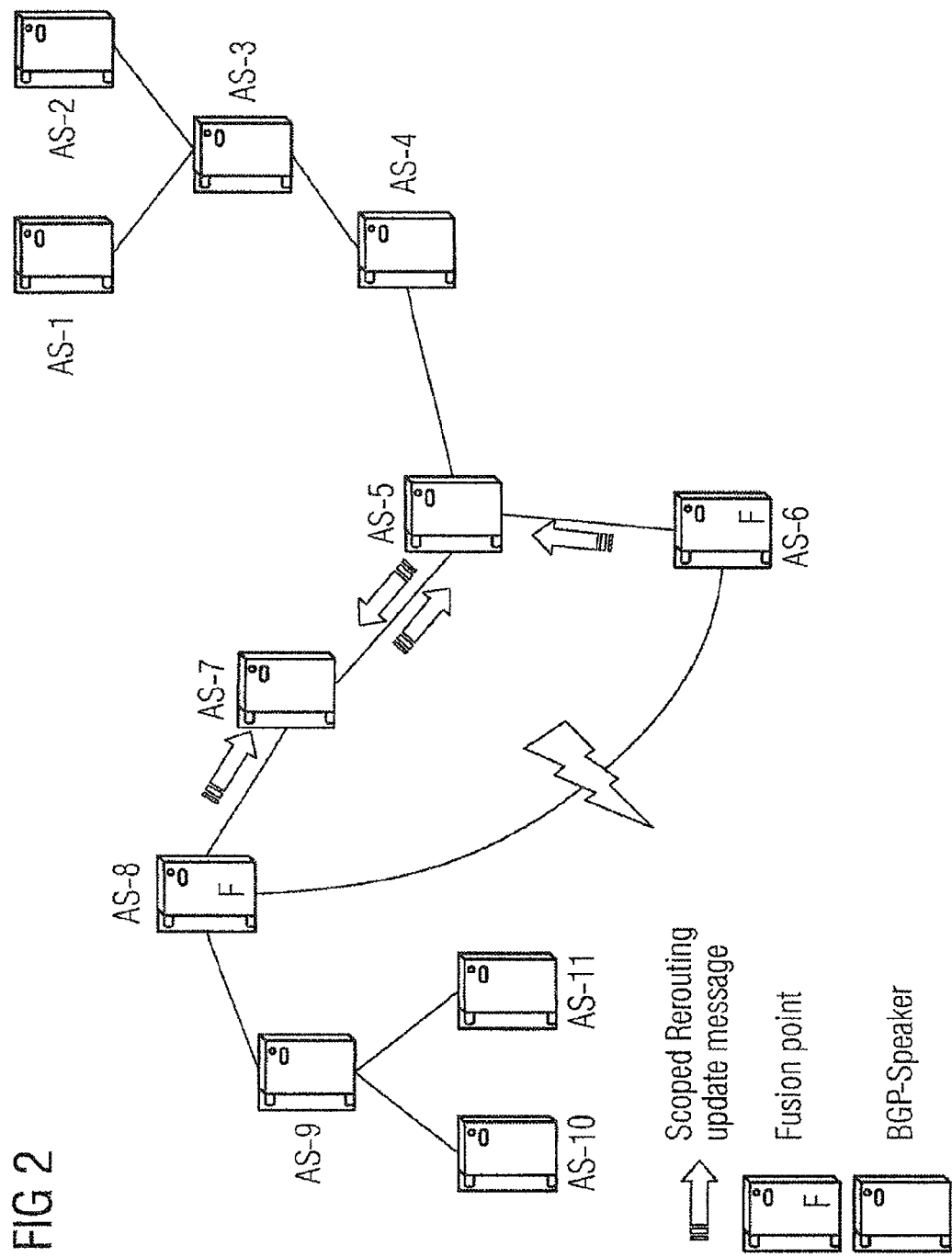
FIG. 2 illustrates an exemplary reaction to a link failure through the provision of an alternative path.

FIG. 1 and FIG. 2 are used to explain the concept of the use of alternative paths for inter-domain routing, as is also described in EP 1453250. In this context, it is assumed that the EGP protocol used is the BGP protocol.

FIG. 1 illustrates eleven autonomous systems or routing domains AS-1 to AS-11 and also links which connect the autonomous systems to one another. The autonomous systems communicate with one another using the BGP protocol, individual routers in the autonomous systems being equipped with appropriate protocol capabilities. In this context, reference is made to BGP speakers or BGP entities. Using these BGP entities, the autonomous systems exchange messages with one another which either confirm the stored state or communicate a change which needs to be taken into account for the routing. FIG. 1 indicates how the BGP protocol controls a reaction to a link failure. In this case, the link between the autonomous systems AS-6 and AS-8 is disrupted. As a reaction to the fault—the reaction is identified by arrows—what are known as update messages are propagated in the entire network or the eleven autonomous systems AS-1, . . . , AS-11 receive update messages which prompt them to recalculate optimum paths in terms of local metrics.

FIG. 2 illustrates the same networking of autonomous systems as FIG. 1. FIG. 2 shows a rapid reaction, providing an alternative path, to the link failure between the autonomous systems AS-6 and AS-8. Messages are sent to autonomous systems which are situated on alternative paths for paths which run via the failed link. The autonomous system AS-8 sends messages about the link failure to the autonomous system AS-7, which in turn sends them to the autonomous system AS-5. Since the autonomous system AS-8 can reach all the autonomous systems in the right hand half of the figure—i.e. the autonomous systems AS-1 to AS-4 and AS-6—via the autonomous systems AS-7 and AS-5, the autonomous system AS-5 does not need to propagate the message received from AS-8 about the link failure further. Similarly, the autonomous system AS-6 sends a message to the autonomous system AS-5. This then informs the autonomous system AS-7. The link failure therefore affects the autonomous systems AS-5 to AS-8, which provide or identify alternative paths for paths running via the failed link. In contrast to the reaction using the BGP protocol as shown in FIG. 1, no messages need to be propagated over the entire network. In the figure, the autonomous systems AS-1 to AS-4 and AS-9 to AS-11 receive no messages about the link failure and do not need to make any adaptations.

Figure 3:
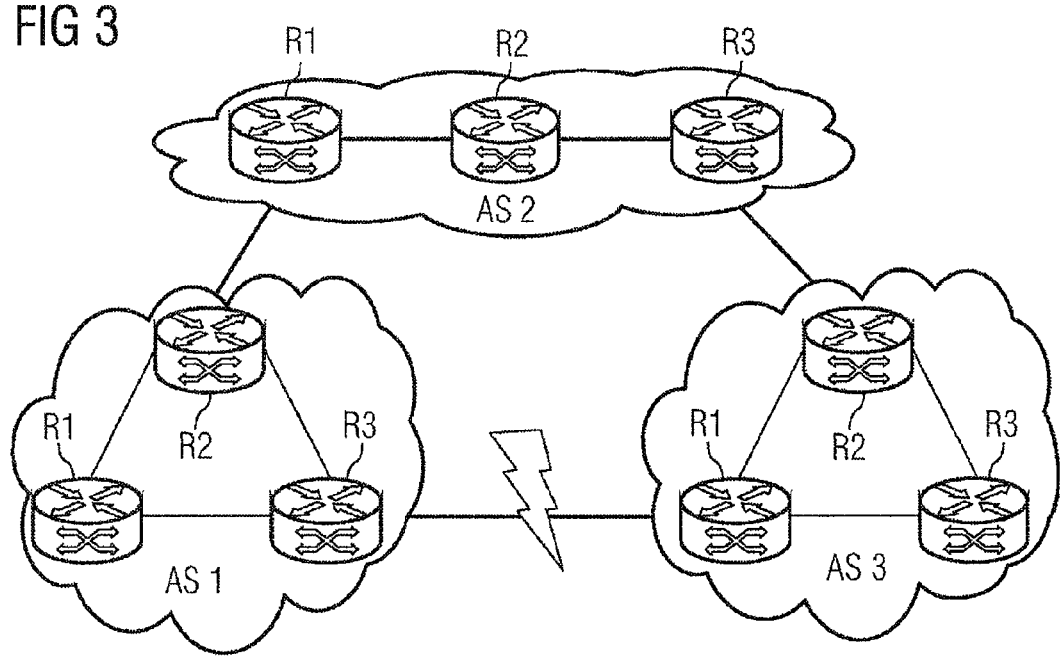
FIG. 3 illustrates an exemplary network configuration with neighboring BGP Inter-domain routers.

FIG. 3 shows an Internet topology. In this case, the clouds represent autonomous systems (AS), namely AS-1, AS-2 and AS-3. This Internet topology can be regarded as a detail from FIG. 1 and FIG. 2 (FIG. 1 and FIG. 2 would need to be complemented by a connection between the autonomous systems AS-1 and AS-2). These autonomous systems exchange their availability information (routes) using the Border Gateway Protocol. The routers R1, R2 and R3 in the autonomous systems are BGP routers, i.e. they can communicate with other BGP entities using the BGP protocol. If, as shown in FIG. 1, the connection between the autonomous systems AS-1 and AS-3 fails then it is necessary to find a new route to the autonomous system AS-3 in order to restore the connectivity.

The scenario is described from the point of view of the autonomous system AS-1. In this case, router R3 in AS-1, which establishes the link failure first, does not know an alternative route to the autonomous system AS-3. By contrast, router R2 in AS-1 knows a route via the autonomous system AS-2 to the autonomous system AS-3. The standardized BGP response would propagate the lack of availability, and the global Internet would need to be made aware of the failure. Using the mechanism disclosed herein, the router R3 in AS-1 can ask its neighboring routers R1 and R2 in AS-1 whether they know an alternative route.

Figure 4:
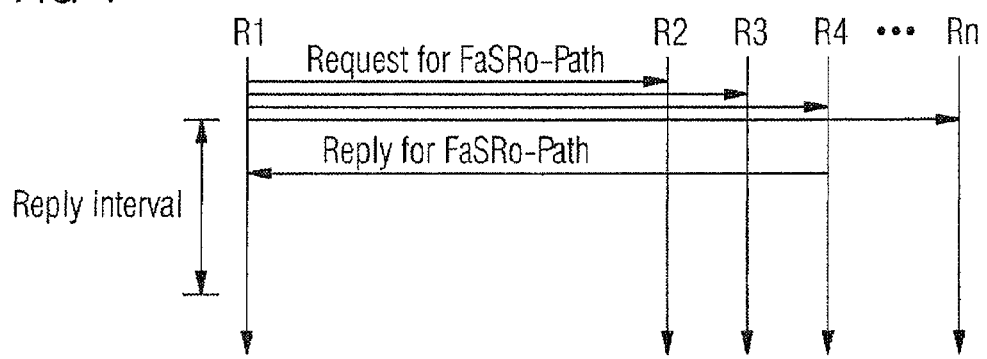
FIG. 4 illustrates an exemplary message exchange for communicating alternative paths.

Such requests are indicated by arrows in FIG. 4. In this case, the alternative paths are referred to as FaSRo-Path (Fast Scoped Rerouting Path). As FIG. 4 shows, a large number of neighboring BGP routers can be asked for an alternative path (R1 to Rn in FIG. 4). It also shows that a response message (reply for FaSRo-Path) is returned from a BGP router R4 (not shown in FIG. 3). This response is sent within a maximum time interval during which responses are considered (reply interval). BGP router R1 will therefore perform routing in line with this alternative path. If no response is received from the routers within the reply interval, BGP would use its inherent mechanism and would propagate the change on the global Internet. As EP 1453250 describes, the BGP mechanism can also be used complementarily if the link has failed permanently (persistent error).

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for providing one or more alternative paths between two routing domains in a packet-oriented network, comprising the steps of:
    receiving data related to a failed link in one of the routing domains in an inter-domain router;
    determining, via the inter-domain router, at least one alternative path to a destination which runs via the failed link;
    notifying routing domains situated on the alternative path of the determination;
    adjusting, via the notified routing domains, inter-domain routing in line with routing to the destination along the alternative path until all the routing domains on the alternative path have adjusted their inter-domain routing;
    wherein, if no alternative path is determined in the router, a request message is sent to at least one neighboring inter-domain router requesting the conveyance of information about at least one alternative path, and
    if a neighboring alternative path is determined in the neighboring interdomain router, the neighboring alternative path is communicated to the interdomain router using a response message.

2. The method according to claim 1, wherein request messages are sent to all available neighboring inter-domain routers.

3. The method according to claim 1, wherein the step of sending at least one request message involves a timer being started, and only alternative paths are communicated before the timer runs out.

4. The method according to claim 3, wherein, if no alternative path is communicated before the timer runs out, a Border Gateway Protocol is used to adapt the inter-domain routing using the link: failure data.

5. The method according to claim 1, wherein the request message contains information about the failed link.

6. A system for providing one or more alternative paths between two routing domains in a packet-oriented network, comprising:
    an inter-domain router that received data related to a failed link in one of the routing domains in an inter-domain router, wherein the inter-domain router determines at least one alternative path to a destination which runs via the failed link, and notifies routing domains situated on the alternative path of the determination;
    wherein the notified routing domains adjust inter-domain routing in line with routing to the destination along the alternative path until all the routing domains on the alternative path have adjusted their inter-domain routing;
    wherein, if no alternative path is determined in the inter-domain router, a request message is sent to at least one neighboring inter-domain router requesting the conveyance of information about at least one alternative path; and if a neighboring alternative path is determined in the neighboring interdomain router, the neighboring alternative path is communicated to the interdomain router using a response message.

7. The system according to claim 6, wherein request messages are sent to all available neighboring inter-domain routers.

8. The system according to claim 6, wherein the interdomain router comprises means for starting a timer, and wherein only alternative paths are communicated before the timer runs out after the request message is sent.

9. The system according to claim 8, wherein, if no alternative path is communicated before the timer runs out, a Border Gateway Protocol is used to adapt the inter-domain routing using the link failure data.

10. The system according to claim 6, wherein the request message contains information about the failed link.

* * * * *